United States Patent [19]

Tominaga

[11] Patent Number: 4,528,363
[45] Date of Patent: Jul. 9, 1985

[54] HEAT-CURABLE RESIN COATING COMPOSITION

[75] Inventor: Akira Tominaga, Hiratsuka, Japan

[73] Assignee: Kansai Paint Co., Ltd., Hyogo, Japan

[21] Appl. No.: 582,595

[22] Filed: Feb. 22, 1984

[30] Foreign Application Priority Data

Feb. 23, 1983 [JP] Japan .................................. 58-27747

[51] Int. Cl.³ .......................... C08G 59/56; C09D 5/44
[52] U.S. Cl. .................................. 528/370; 204/181.7; 528/371; 528/405
[58] Field of Search .......................... 528/370, 371, 405

[56] References Cited

U.S. PATENT DOCUMENTS

| | | | |
|---|---|---|---|
| 3,072,613 | 1/1963 | Whelan et al. | 528/370 |
| 4,122,068 | 10/1978 | Meyer | 528/93 |
| 4,180,646 | 12/1979 | Choi et al. | 528/405 |
| 4,336,116 | 6/1982 | Schupp et al. | 204/159.11 |
| 4,341,676 | 7/1982 | Patricca et al. | 523/417 |
| 4,414,068 | 11/1983 | Patricca et al. | 204/181 C |

Primary Examiner—Herbert S. Cockeram
Attorney, Agent, or Firm—Wenderoth, Lind & Ponack

[57] ABSTRACT

A heat-curable resin coating composition comprising as a resin binder a film-forming resin which contains at least two tertiary nitrogen atoms per molecule and may optionally contain primary or secondary amino groups, each of said tertiary nitrogen atoms having directly bonded thereto a functional group represented by the following formula

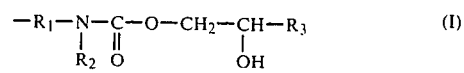

wherein $R_1$ represents a divalent saturated aliphatic hydrocarbon group having 1 to 18 carbon atoms which may be substituted by a hydroxyl group and/or may be interrupted by an ether linkage (—O—); $R_2$ represents a hydrogen atom, a substituted or unsubstituted alkyl group having 1 to 6 carbon atoms, or a part of the main chain of the resin; and $R_3$ represents a hydrogen atom or a hydrocarbon group having 1 to 12 carbon atoms which may be substituted by a hydroxyl group and/or may be interrupted by an ether linkage, and each of said tertiary nitrogen atoms optionally forming a member of a nitrogen-containing heterocyclic ring formed together with $R_1$ and $R_2$ in the above formula and the nitrogen atom to which they are bonded.

16 Claims, No Drawings

HEAT-CURABLE RESIN COATING COMPOSITION

This invention relates to a novel heat-curable resin coating composition, and more specifically, to a heat-curable resin coating composition having improved low-temperature curability, self-curability, corrosion resistance, etc. and being particularly suitable for cationic electrodeposition coating.

Heretofore, resin binders of such a type that a polyamine resin, for example an amine-added epoxy resin, is cured with an alcohol-blocked aromatic polyisocyanate compound have most frequently be used in resin compositions for cationic electrodeposition coating, and the corrosion resistance of coated films obtained from such coating compositions has been rated high. Coating resin compositions of this type, however, have the essential defect that the temperature at which they begin to cure is as high as more than 180° C. They also have other serious defects the elimination of which has been strongly desired. For example, these resin compositions require an organic tin compound as a curing catalyst, and the organic tin compound poisons an exhaust burning catalyst in a baking oven. Under heat at high temperatures, the polyisocyanate decomposes to form a gummy material or soot, and moreover, causes yellowing and bleeding of the top coat and impairs its curing. Furthermore, coated films prepared from this type of coating compositions have very poor weatherability and are susceptible to chalking.

The present inventor has extensively worked in order to provide a heat-curable resin coating composition, particularly useful for cationic electrodeposition coating, which without using a polyisocyanate compound as a curing agent, has equivalent or better film properties and electrodeposition characteristics to or than a conventional resin coating composition containing a polyisocyanate curing agent, and which is free from the various defects described above.

This work has led to the discovery that by introducing beta-hydroxyalkyl carbamate groups into a base resin such as an epoxy resin via tertiary amino groups, the aforesaid purpose can be achieved and a resin composition for electrodeposition coating which does not adversely affect film properties and electrodeposition characteristics can be obtained.

Thus, according to this invention, there is provided a heat-curable resin coating composition comprising as a main resinous binder a film-forming resin which contains at least two tertiary nitrogen atoms per molecule and may optionally contain primary or secondary amino groups, each of said tertiary nitrogen atoms having directly bonded thereto a functional group represented by the following formula (i.e., a beta-hydroxyalkyl carbamate group)

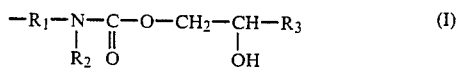

wherein $R_1$ represents a divalent saturated aliphatic hydrocarbon group having 1 to 18 carbon atoms which may be substituted by a hydroxyl group and/or may be interrupted by an ether linkage (—O—); $R_2$ represents a hydrogen atom, a substituted or unsubstituted alkyl group having 1 to 6 carbon atoms, or a part of the main chain of the resin; and $R_3$ represents a hydrogen atom or a hydrocarbon group having 1 to 12 carbon atoms which may be substituted by a hydroxyl group and/or may be interrupted by an ether linkage, and each of said tertiary nitrogen atoms optionally forming a member of a nitrogen-containing heterocyclic ring formed together with $R_1$ and $R_2$ in the above formula and the nitrogen atom to which they are bonded.

When the heat-curable resin coating composition of this invention is heated to at least about 150° C., the beta-hydroxyalkyl carbamate groups of formula (I) decompose under the catalytic action of the tertiary amino group to which the functional group is bonded to form a urethane linkage between beta-hydroxycarbamate groups as shown by reaction formula (1) below, or a urea linkage between the beta-hydroxycarbamate groups and a primary or secondary amino group (—$NHR_4$) which may optionally be present in the resin as shown by reaction formula (2) below, whereby the resin composition is cured.

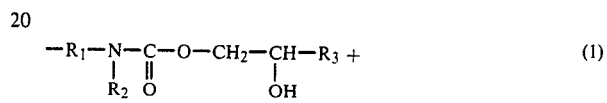

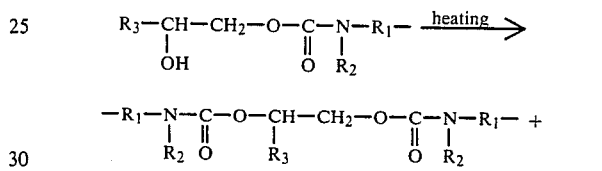

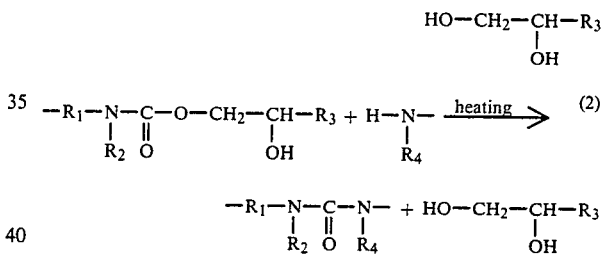

In the formulae (1) and (2), $R_1$, $R_2$ and $R_3$ are as defined above, and $R_4$ represents a hydrogen atom or an organic radical.

Accordingly, the heat-curable resin coating composition of this invention can be cured at a relatively low temperature of 170° C. or below without requiring a tin catalyst. In addition, as is clear from the reaction formula (1) or (2), the coating composition does not liberate an isocyanate compound or its derivative at the time of heat decomposition, and does not exert a deleterious effect on a top coat which is applied to a coated film prepared from the coating resin composition of this invention. Furthermore, the coating composition of the invention has the excellent advantage that it does not bring an aromatic urethane linkage or an aromatic urea linkage into the crosslinkage of the resin, and does not undergo rapid degradation in weatherability.

In addition to curing by utilizing the aforesaid heat curing reaction, the coating composition of this invention can also be cured by using conventional polyisocyanate curing agents.

The "divalent saturated aliphatic hydrocarbon group having 1 to 18 carbon atoms which may be substituted by a hydroxyl group and/or may be interrupted by an ether linkage (—O—)" represented by $R_1$ in formula (I) may preferably be the hydrocarbon group moiety constituting aliphatic polyamine molecules, or a part thereof. The saturated aliphatic hydrocarbon may be a linear or branched alkylene group preferably having 1 to 18 carbon atoms, especially 1 to 9 carbon atoms. Such an alkylene group may be substituted by 1 to 6 hydroxyl groups, preferably 1 to 3 hydroxyl groups. The number of ether linkages by which the hydrocarbon group is interrupted is not more than 6, preferably not more than 3. Specific examples of the divalent saturated aliphatic hydrocarbon group represented by $R_1$ are

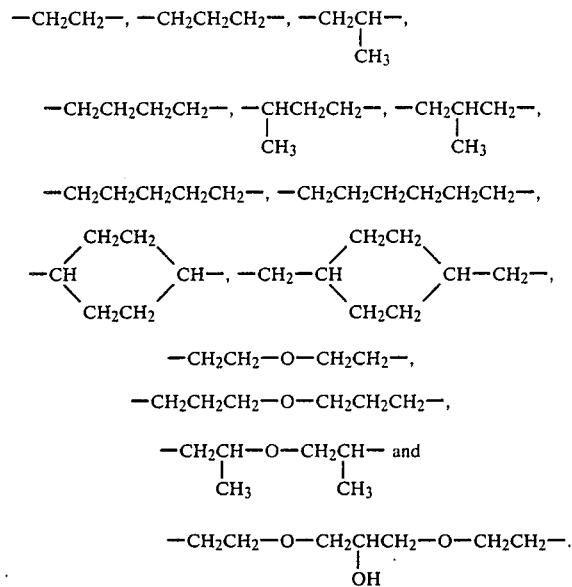

Especially preferred are $-CH_2CH_2-$, $-CH_2CH_2CH_2-$,

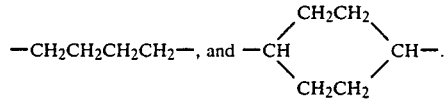

The alkyl group having 1 to 6 carbon atoms, preferably 1 to 3 carbon atoms, represented by $R_2$ in formula (I) may have a hydroxyl, amino, amide or ether group. Specific examples include methyl, ethyl, propyl, isopropyl, hydroxyethyl, hydroxypropyl, aminoethyl, aminopropyl, amidoethyl, methoxyethyl, methoxypropyl and ethoxyethyl.

$R_2$ in formula (I) may represent a part of the main chain of the resin so long as it does not substantially adversely affect the curing reaction of the film-forming resin. Examples of the film-forming resin are epoxy, polyamide and poly(alpha,beta-unsaturated carbonyl) resins. These resins may contain a substituent such as a hydroxyl, carboxylate, amino, imino, nitrile or amide group, and/or may have an ether, imide, urea, urethane, amide, or ester linkage.

Preferably, $R_2$ includes hydrogen, methyl, ethyl, hydroxyethyl, and aminoethyl.

$R_3$ in formula (I) represents a hydrogen atom, or a hydrocarbon group having 1 to 12 carbon atoms, preferably 1 to 6 carbon atoms, more preferably 1 to 3 carbon atoms, which may contain a hydroxyl or ether group. Examples of the hydrocarbon groups include alkyl groups having 1 to 6 carbon atoms, preferably 1 to 3 carbon atoms, such as methyl, ethyl, propyl, isopropyl, butyl, sec-butyl, isobutyl, and tert-butyl; aryl groups such as phenyl, tolyl and xylyl; and aralkyl groups such as benzyl. A hydrogen atom and a methyl group are preferred as $R_3$.

As stated above, the tertiary nitrogen atom to which the functional group of formula (I) is bonded can constitute a member of a nitrogen-containing heterocyclic ring formed together with $R_1$ and $R_2$ and the nitrogen atom to which $R_1$ and $R_2$ are bonded. Such a nitrogen-containing heterocyclic ring includes, for example, 5- to 7-membered heterocyclic rings which may further contain an oxygen or sulfur atom as a hetero atom, such as

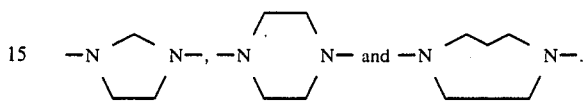

Typical examples of the beta-hydroxyalkyl carbamate groups of formula (I) are shown below.

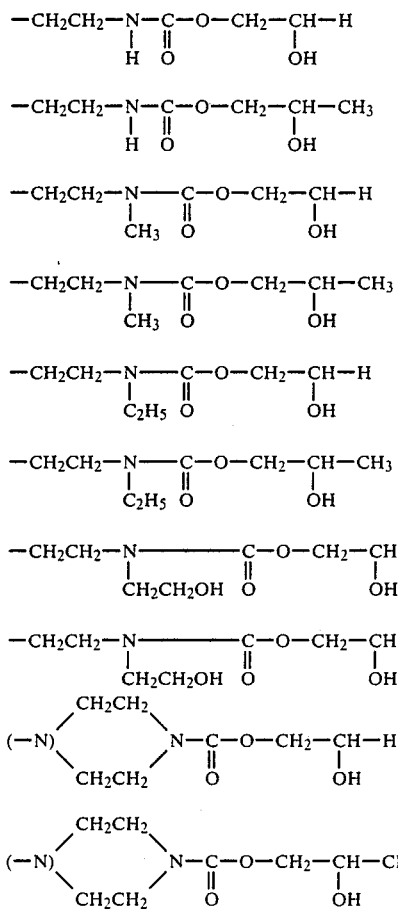

The tertiary nitrogen atom to which the functional group of formula (I) is directly bonded may be a part of the main chain of a base resin constituting the film-forming resin, or a part of the pendant side-chain of the base resin.

The film-forming resin used as a resin binder in the coating composition of this invention may be any resins which contain at least two functional groups (beta-hydroxyalkyl carbamate groups) of formula (I) per molecule and may, as required, further contain primary and/or secondary amino groups and have film forming ability. Such a resin can be easily produced industrially by reacting a base resin having an active group capable of reacting with a primary or secondary amino group, such as an epoxy group, an alpha,beta-unsaturated carbonyl group or a carboxyl group (or an active ester thereof), an aliphatic polyamine which contains at least two primary or secondary amino groups and may optionally contain a tertiary amino group, and ethylene carbonate which may be substituted by $R_3$.

The resin having the functional groups represented by formula (I) (beta-hydroxyalkyl carbamate groups) can be synthesized by properly combining the following reaction (A) with the following reaction (B) and/or the following reaction (C).

(A) Formation of beta-hydroxyalkyl carbamate groups by the reaction of the primary or secondary amino groups of the aliphatic polyamine with an alkylene carbonate.

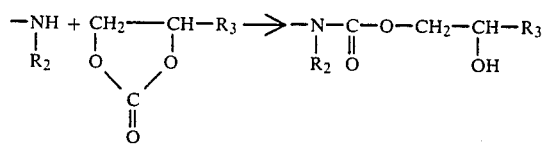

(B) Formation of tertiary amino groups by the reaction of the primary or secondary amino groups of the aliphatic polyamine with either (1) epoxy groups, (2) alpha,beta-unsaturated carbonyl groups, or (3) a carboxylic acid.

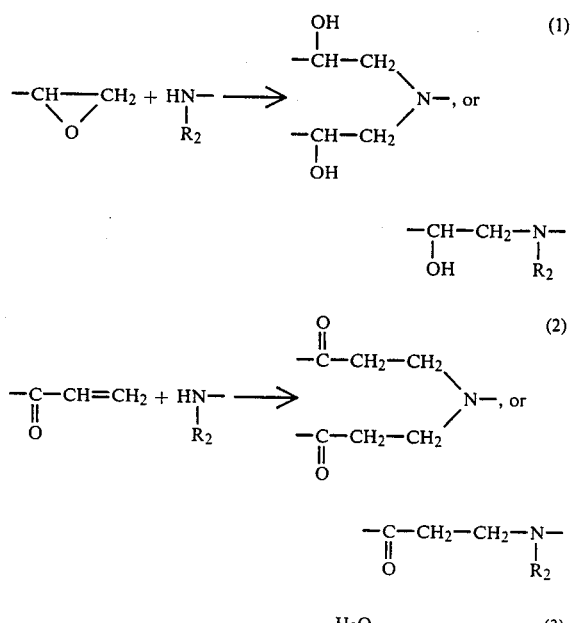

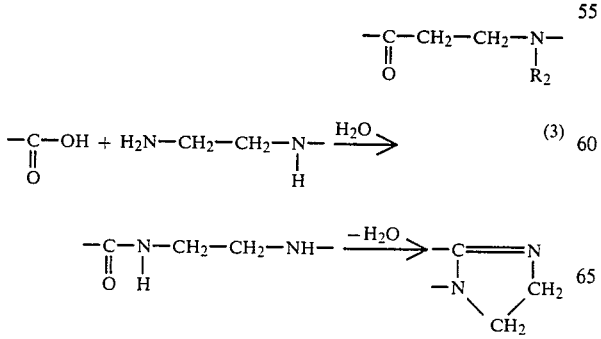

The reaction (B) is a reaction which is intended to form tertiary amino groups, but at the same time, introduces these amino groups into the skeleton of the resin. When it is desired only to introduce the amino groups into the skeleton of the resin, the reaction (C) below may also be used.

(C) The primary or secondary amino groups or the hydroxyl group of the aliphatic polyamine are reacted with (1) a carboxyl group (or is active ester), or (2) an isocyanate group.

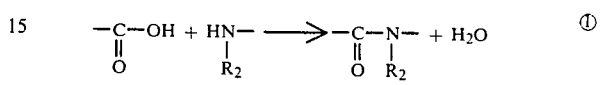 ①

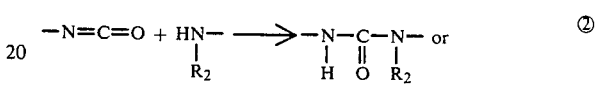 ②

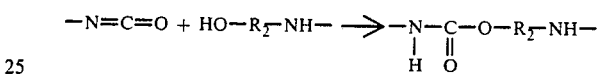

$R_2$ in the reactions (A) to (C) is the same as defined hereinabove.

Processes for producing typical film-forming resins used in the coating composition of this invention will be described below in detail. It should be understood that the description of these processes is intended to facilitate understanding, and does not in any way limit the scope of the film-forming resins used in this invention.

The above resin contains at least two functional groups of formula (I) per molecule. The preferred content of the functional groups differs depending upon the molecular weight of the resin. Advantageously, the molecular weight per functional group, i.e. the equivalent weight, is preferably 250 to 5,000, more preferably 500 to 2,500.

Desirably, the resin used in the present invention has an amino group selected from aliphatic primary and secondary amino groups in addition to the functional groups of formula (I). Advantageously, it has an amino group content, in terms of an amine value (milligrams of KOH per gram of the resin), of 10 to 200, preferably 20 to 100.

Process I

An epoxy resin having at least two epoxy groups (base resin) is reacted with an aliphatic polyamine having at least two active amino groups selected from primary and secondary amino groups to introduce the primary and/or secondary amino groups into the epoxy resin by the addition reaction between the epoxy groups and the active amino groups. Thereafter, the product is reacted with an alkylene carbonate. Taking up as an example the case of using an aliphatic diamine containing two primary or secondary amino groups as the aliphatic polyamine, this reaction is schematically shown below.

Reaction Scheme I

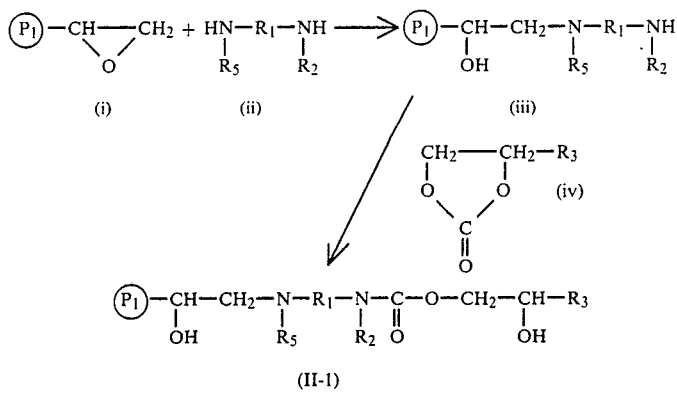

(II-1)

In the above scheme:
(P₁) represents the main portion of the epoxy resin [in formula (i), only one epoxy group is depicted for simplicity, but it should be understood that at least one other epoxy group is bonded to (P₁)];
$R_1$ and $R_2$ are the same as defined above; and
$R_1$, $R_2$ and $R_5$ may form a nitrogen-containing heterocyclic ring which may further contain an oxygen or sulfur atom as a hetero atom, together with the two nitrogen atoms to which they are bonded.

The reaction shown by reaction scheme I may equally be applied to other aliphatic polyamines which contain only two primary or secondary amino groups, for example the polyamines shown in (b) (provided that $R_{13}$ is not H), (d) and (e).

When a polyamine containing at least 3 primary and secondary amino groups combined represented by the following formula

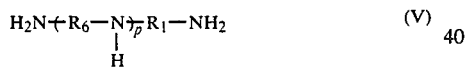

wherein $R_6$ represents a divalent saturated aliphatic hydrocarbon group which may be substituted by a hydroxyl group and/or may be interrupted by an ether linkage, and p is an integer of at least 1, is used as the aliphatic polyamine, the reaction may be carried out between the terminal primary amino group and the epoxy resin. Or, the primary amino groups at both ends are temporarily protected by ketimination or aldimination, and then one secondary amino group in the chain may be reacted with the epoxy resin. By the latter reaction, two primary amino groups may be simultaneously introduced into the epoxy resin.

The latter reaction is schematically shown below by taking up an aliphatic triamine as an example.

Reaction Scheme II

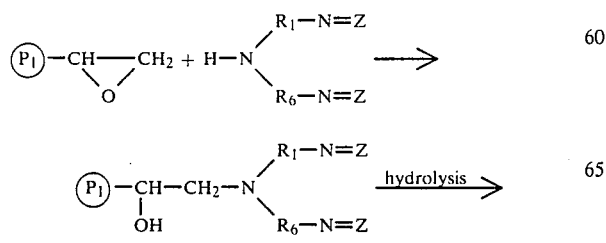

-continued
Reaction Scheme II

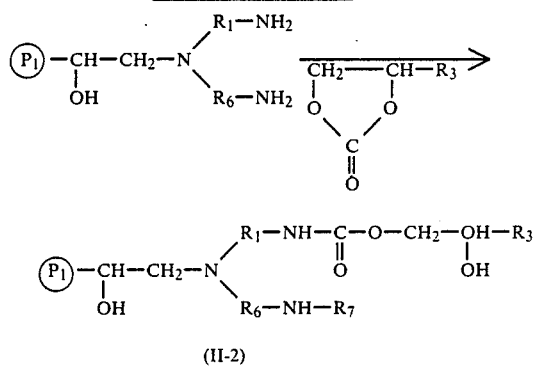

(II-2)

In the reaction scheme:
Z represents a ketimine or aldimine protective group;
$R_7$ represents H or

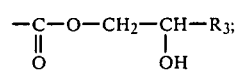

and
(P₁), $R_1$, $R_3$ and $R_6$ are the same as defined hereinabove.

Alternatively, as illustrated by the following reaction scheme III, it is possible to react the aliphatic polyamine and the alkylene carbonate in advance, and react the resulting product with the epoxy resin.

Reaction Scheme III

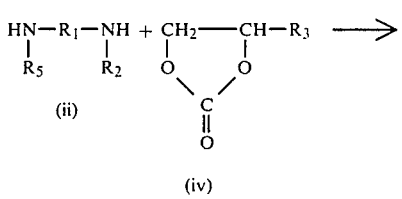

-continued
Reaction Scheme III

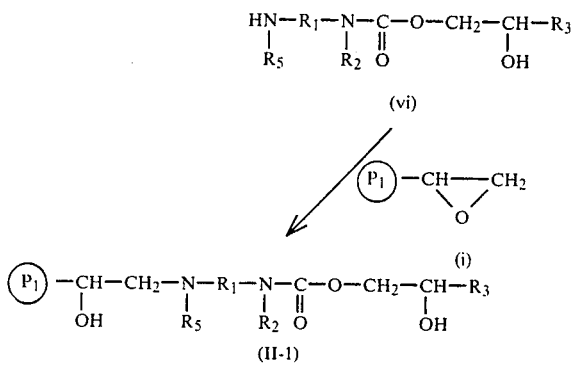

(II-1)

In the above reaction scheme, (P₁), R₂, R₃ and R₅ are the same as defined hereinabove.

Each of the unit reactions shown in the reaction schemes I, II and III does not at all require a catalyst, and can be carried out at a relatively low reaction temperature ranging from room temperature to about 100° C. The reaction proceeds almost quantitatively.

As stated above, the nitrogen atom to which the functional group of the formula

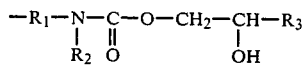

is bonded is tertiary. Hence when in the resin of formula (II-1) produced as above, the amino group to which the functional group of the above formula is directly bonded is secondary, the secondary amino group may be converted to a tertiary amino group by reacting the secondary amino group with, for example, a mono-epoxy compound or a mono-alpha,beta-unsaturated carbonyl compound.

The epoxy resin used as the base resin in the above reaction is a high-molecular-weight substance having at least two epoxy groups

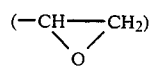

on an average per molecule. Generally, epoxy resins having a number average molecular weight of at least 350, preferably 500 to 10,000, more preferably 1,000 to 5,000, are suitable. Epoxy resins known per se may be used. Examples include polyglycidyl ethers of polyphenols which can be produced by reacting polyphenols with epichlorohydrin in the presence of alkalies. Examples of the polyphenols which can be used are bis(4-hydroxyphenyl)-2,2-propane, 4,4'-dihydroxybenzophenone, bis(4-hydroxy-phenyl)-1,1-ethane, bis-(4-hydroxyphenyl)-1,1-isobutane, bis(4-hydroxy-tert-butylphenyl)-2,2-propane, bis(2-hydroxynaphthyl)methane, and 1,5-dihydroxynaphthalene. Epoxy resins obtained by reacting diglycidyl ethers with the aforesaid polyphenols and reacting the products further with epichlorohydrin can also be used.

Other useful epoxy resins include polyglycidyl ethers of phenolic novolak resins and polyglycidyl ethers of polyhydric alcohols. Examples of the polyhydric alcohols include ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2-propane.

Polyglycidyl esters of polycarboxylic acids such as succinic acid, glutaric acid, terephthalic acid, 2,6-naphthalenedicarboxylic acid and dimerized linolenic acid can also be used.

There can also be used epoxy group-containing acrylic polymers obtained by polymerizing an epoxy group-containing monomer such as glycidyl acrylate or glycidyl methacrylate with or without at least one other polymerizable ethylenically unsaturated monomer such as methyl acrylate, ethyl acrylate, methyl methacrylate, acrylamide, methacrylamide, acrylonitrile, methacrylonitrile or styrene. Epoxidized polybutadiene and epoxidized polycycloalkenes are also among the epoxy resins which can be used in this invention.

Those epoxy resins which are especially suitable for cationic electrodeposition coating are polyglycidyl ethers of polyphenols having a number average molecular weight of at least about 350, preferably about 350 to about 3,000, and an epoxy equivalent of 150 to 4,000, preferably 190 to 2,000, and especially preferably epoxy resins represented by the following general formula

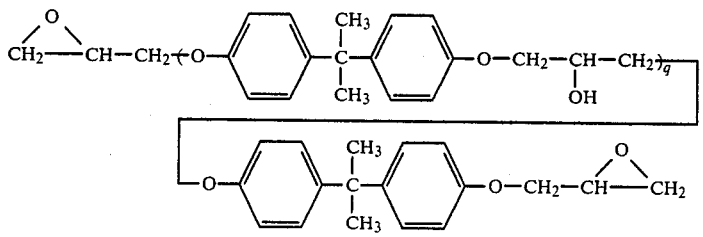

in which q is 0 to 4. They include the following commercial epoxy resins available from Shell Chemical Co. under the following tradenames.

Epikote 828 (bisphenol A type, average molecular weight about 380, epoxy equivalent about 190);

Epikote 1001 (bisphenol A type, average molecular weight about 900, epoxy equivalent about 475);

Epikote 1002 (bisphenol A type, average molecular weight about 1300, epoxy equivalent about 650);

Epikote 1004 (bisphenol A type, average molecular weight about 1400, epoxy equivalent about 950); and Epikote 1007 (bisphenol A type, average molecular weight about 2900, epoxy equivalent about 1900).

Examples of the aliphatic polyamine used as one starting material in the above reaction are listed below.

(a) Aliphatic polyamines of the following general formula

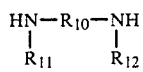

wherein $R_{10}$ represents an alkylene group having 1 to 18 carbon atoms, preferably 2 to 9 carbon atoms, and $R_{11}$ and $R_{12}$ each represent a hydrogen atom or an alkyl group having 1 to 6 carbon atoms, preferably 1 to 3 carbon atoms, which may be substituted by a hydroxyl group and/or an ether linkage.

Specifically, they include, for example, ethylenediamine, 1,2- and 1,3-diaminopropanes, 1,4-diaminobutane, hexamethylenediamine, 1,3-bisaminomethylcyclohexane, bis-(3-aminopropoyl)ether, N-methylethylenediamine, hydroxyethylaminoethylamine, hydroxyethylaminopropylamine, N,N'-dimethylethylenediamine and N,N'-dihydroxyethylethylenediamine.

(b) Aliphatic polyamines represented by the following formula

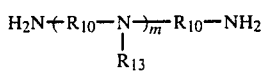

wherein $R_{13}$ represents a hydrogen atom or an alkyl group having 1 to 3 carbon atoms which may be substituted by a hydroxyl group, m represents an integer of 1 to 9, preferably 1 to 6, and $R_{10}$ is as defined hereinabove.

Specific examples include diethylenetriamine, triethylenetetramine, tetraethylenepentamine, iminobispropylamine, bis(hexamethylene)triamine, methyliminobisethylamine and methyliminobispropylamine.

(c) Aliphatic polyamindes represented by the following formula

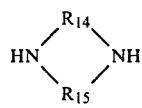

wherein $R_{14}$ and $R_{15}$ each represent an alkylene group having 1 to 3 carbon atoms, such as piperazine and homopiperazine

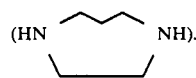

(d) Aliphatic polyamines represented by the following formula

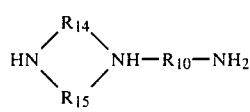

wherein $R_{10}$, $R_{14}$ and $R_{15}$ are as defined above, such as N-aminoethylpiperazine and N-aminopropylpiperazine.

(e) Aliphatic polyamines represented by the following formula

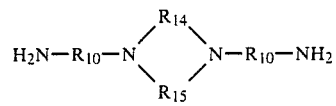

wherein $R_{10}$, $R_{14}$ and $R_{15}$ are as defined above, such as N,N'-bisaminopropylpiperazine.

Preferred aliphatic polyamines are ethylenediamine, hexamethylenediamine, diethylenetriamine, piperazine, hydroxyethylethylenediamine and N-aminoethylpiperazine which are easily available commercially and industrially.

Examples of the alkylene carbonate include ethylene carbonate, propylene carbonate, glycerin carbonate, styrene carbonate and butylene carbonate. Ethylene carbonate and propylene carbonate are preferred and easily available industrially.

Examples of the monoepoxide compound which is used for converting the secondary amino group into a tertiary amino group are ethylene oxide, propylene oxide, styrene oxide and phenyl glycidyl ether. Examples of the mono-alpha,beta-unsaturated carboxyl compound include methyl (meth)acrylate, ethyl (meth)acrylate, butyl (meth)acrylate, 2-ethylhexyl (meth)acrylate, 2-hydroxyethyl (meth)acrylate, (meth)acrylamide and (meth)acrylonitrile.

Process II

A resin having the functional groups of formula (I) in accordance with the present invention can be obtained in the same way as in process I described above except that a resin containing at least two alpha,beta-unsaturated carbonyl groups [to be referred to as a poly(alpha,beta-unsaturated carbonyl) resin] is used instead of the epoxy resin in process I.

One example of this process is shown by the following reaction scheme corresponding to Reaction Scheme I above with regard to the case of using the aliphatic diamine of formula (ii).

Reaction Scheme IV

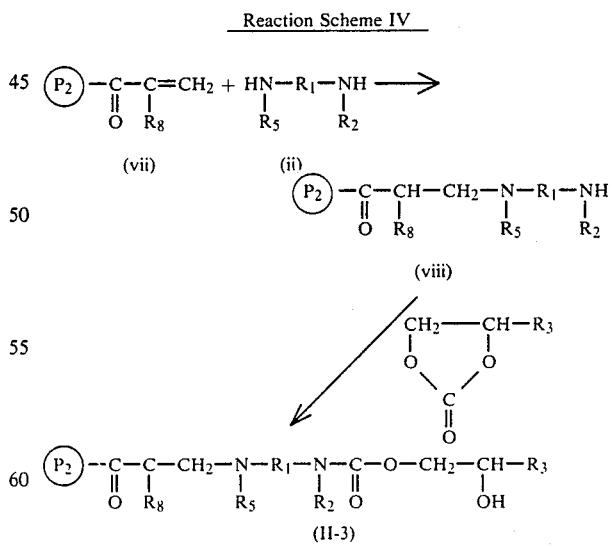

In the reaction scheme above:

$(P_2)$ represents the main portion of the poly(alpha,-beta-unsaturated carbonyl) resin [in formula (vii), only one alpha,beta-unsaturated carbonyl group is depicted for simplicity, but it should be understood that at least one other alpha,beta-unsaturated carbonyl group is bonded to $(P_2)$];

$R_8$ represents a hydrogen atom, or an alkyl group having 1 to 4 carbon atoms, especially a methyl group; and $R_1$, $R_2$, $R_3$ and $R_5$ are as defined hereinabove.

Examples of the poly(unsaturated carbonyl) resin which can be used as a base resin in process II are listed below.

(1) Esterification products formed between polyepoxides and alpha,beta-unsaturated monocarboxylic acids.

(2) Esterification products formed between polycarboxylic acids (or the anhydrides thereof) and glycidyl esters of alpha,beta-unsaturated monocarboxylic acids [for example, glycidyl (meth)acrylate] or hydroxyalkyl esters of these alpha,beta-unsaturated monocarboxylic acids [for example, hydroxyethyl (meth)acrylate].

(3) Urethanization products of polyols and hydroxyalkyl esters of alpha,beta-unsaturated monocarboxylic acid/diisocyanate adducts.

(4) Esterification products or ester-interchange products of polyol and alpha,beta-unsaturated monocarboxylic acids or their lower ($C_{1-6}$) alcohol esters.

In (1) to (4), the same epoxy resins as described with regard to process I are suitably used as the polyepoxides. A styrene/maleic anhydride copolymer is an example of the polycarboxylic acid, and a styrene-allyl alcohol copolymer is an example of the polyol. Furthermore, acrylic acid may be cited as the alpha,beta-unsaturated monocarboxylic acid.

Process III

This process is the same as the process I except that a resin containing at least two carboxyl groups or their active ester derivatives is used instead of the epoxy resin in process I. One example of this process is shown by the following reaction scheme corresponding to Reaction Scheme I with regard to the case of using the aliphatic polyamine shown in (b) above (provided that $R_{13}$ is not H).

Reaction Scheme V

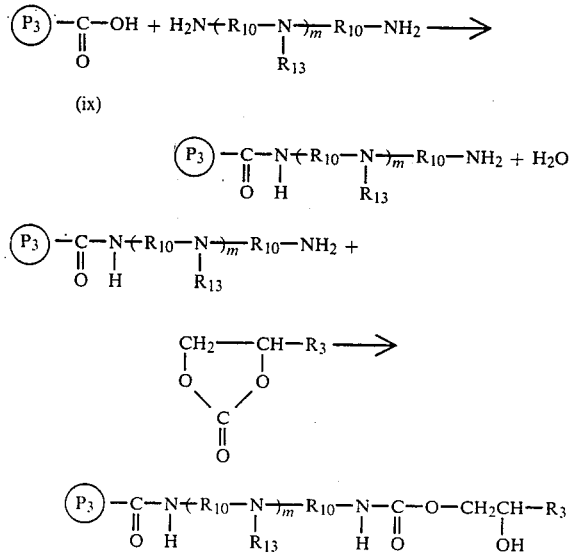

(ix)

In the above reaction scheme:

$(P_3)$ represents the main portion of the resin containing carboxyl groups or active ester derivatives thereof [in formula (ix), only one carboxyl group is depicted for simplicity, but it should be understood that at least one other carboxyl group or its active ester derivative is bonded to $(P_3)$]; and $R_{10}$, $R_{13}$ and m are as defined hereinabove.

Examples of the base resin used in process III are a styrene/maleic anhydride copolymer, dimeric fatty acids, and a carboxy-terminated butadiene-acrylonitrile copolymer.

The heat-curable resin coating composition of this invention contains as a main resinous binder the film-forming resin containing at least two functional groups of formula (I) per molecule which is produced by the processes described above. As required, it may contain a resin having at least about two aliphatic primary and/or secondary amino groups on an average per molecule as a curing agent.

Examples of the resin containing at least about two aliphatic primary and/or secondary amino groups on an average per molecule are the reaction products of epoxy resins with ammonia or an amine having an aliphatic primary and/or secondary amino group. Specific examples are listed below.

(1) Reaction products between polyepoxides and ammonia (see, for example, Japanese Laid-Open Patent Publication No. 149318/1980).

(2) Addition products of polyepoxides with primary mono- and polyamines, secondary polyamines or polyamines having both a primary and a secondary amino group (see, for example, U.S. Pat. No. 3,984,299).

(3) Addition products of polyepoxides with secondary mono- and polyamines having a ketiminated primary amino group (see, for example, U.S. Pat. No. 4,017,438).

(4) Reaction products obtained by etherification of polyeoxides and hydroxy compounds having a ketiminated primary amino group (see, for example, the specification of Japanese Patent Application No. 152756/1982).

Examples of the epoxy resin used in the aforesaid reaction products are polyglycidyl ethers of polyphenols. Preferred are bisphenol-type epoxy resins having a number average molecular weight of at least 350, preferably about 350 to about 3,000 and an epoxy equivalent of 190 to 2,000 and produced by the reaction of bisphenol A or bisphenol F with epichlorohydrin.

Examples of the amine to be reacted with the epoxy resin include monoalkylamines and monoalkanolamines such as ethylamine, propylamine, butylamine, ethylenediamine, hexamethylenediamine, diethylenetriamine, ethanolamine or propanolamine and the aliphatic polyamines shown in (a) to (e) above. Of these, methylamine, ethylamine, monoethanolamine, ethylenediamine, hexamethylenediamine and diethylenetriamine are preferred.

Poly(ester)-amide-polyamine resins, polyurethane-(urea)-polyamine resins and adducts of polycarboxylic acids and alkyleneimines may also be used. Specific examples of these resins are listed below.

(5) Poly(ester)-amide-polyamine resins obtained by the condensation of polycarboxylic acids and polyamines having primary and/or secondary amino groups (optionally polyols as well) (see, for example, the specification of U.S. Pat. No. 3,799,854).

(6) Polyurethane-(urea)-polyamine resins obtained by reacting polyols (and optionally polyamines as well), hydroxy compounds having a ketiminated primary amino group, and diisocyanates (see, for example, Japanese Laid-Open Patent Publication No. 129271/1981).

(7) Adducts formed between polycarboxylic acids and alkyleneimines (see, for example, the specification of U.S. Pat. No. 3,719,629).

Especially preferred resins used as a curing agent are polyamidepolyamine resins formed by the condensation reaction between aliphatic polybasic acids such as phthalic acid, adipic acid, sebacic acid and dimeric acid and aliphatic polyamines such as ethylenediamine, hexamethylenediamine, diethylenetriamine, triethylenetetramine and propylenediamine. The use of these resins in cationic electrodeposition coating resin compositions lead to an improvement in the water dispersibility of the compositions, and the surface smoothness and flexibility of coated films prepared from the compositions. Specific examples of the polyamidepolyamine resins are those available under the tradenames Versamid 100, 115, 125 and 140 from Japan General Mills Co., Ltd.

As a curing agent component, a resin obtained by substituting less than two amino groups of a resin containing at least about two aliphatic primary and/or secondary amino groups per molecule by the betahydroxyalkyl carbamate groups can also be used either alone or in combination with the aforesaid resins.

The above resins which can be used as a curing agent component may be separately produced and added to the composition of this invention. But, of course, they can be simultaneously formed at the time of producing the film-forming resin used in the invention which has at least two beta-hydroxyalkyl carbamate groups per molecule.

The proportion of the resin which can be used as a curing agent is preferably such that the number of the aliphatic primary and/or secondary amino groups is equivalent to, or smaller than, that of the beta-hydroxyalkyl carbamate groups. The resin component in the heat-curable resin coating composition of this invention does not necessarily need to contain primary and/or secondary amino groups. But when the coating composition of this composition is to be used as a resin composition for cationic electrodeposition coating by neutralizing it with an acid and dispersing it in water, it is frequently preferable for the resin component to have an aliphatic primary and/or secondary amino group in addition to the tertiary amino groups to which the beta-hydroxyalkyl carbamate groups are bonded. The amount of the primary and/or secondary amino groups may be freely adjusted according to the dispersibility of the resin composition, and is preferably such that the average amine value of the resin coating composition is in the range of 10 to 100. These primary or secondary amino groups may be introduced by known methods.

To introduce primary amino groups preferentially in advance and leave them until the resin composition is neutralized and dispersed in water, there is effectively employed a method which comprises reacting the primary amino groups with a carbonyl compound (a ketone or an aldehyde) to protect them as ketimine or aldimine groups.

The heat-curable resin coating composition of this invention does not necessarily require a curing catalyst. Of course, the curing reaction may be promoted by adding a compound known as a urethane liberating catalyst, such as a metal salt of lead, tin, zinc, iron or manganese. For example, lead salts such as lead octenoate, lead naphthenate and lead silicate, are especially effective.

For use as an electrodeposition coating composition, the heat-curable resin coating composition of this invention is treated with an organic or inorganic acid such as acetic acid, lactic acid or phosphoric acid to neutralize partly the primary and/or secondary amino groups in the resin and form an aqueous dispersion. Preferably, the neutralization is carried out until 0.1 to 0.7, preferably 0.2 to 0.5, equivalent of the primary and/or secondary amino groups are neutralized. The resulting aqueous dispersion has a pH of generally 3 to 9, preferably 5 to 7, and a resin concentration of generally 3 to 30% by weight, preferably 5 to 15% by weight.

As desired, a pigment is added to the aqueous dispersion. Any pigments which are usually employed in electrodeposition paints can be used. Examples include colored pigments such as red iron oxide, titanium white and carbon black; extender pigments such as talc, clay and mica; and rust-proof pigments such as chromate salts, strontium chromate and basic lead silicate. The amount of the pigment is optional.

If desired, a small amount of a known surface-active agent agent (for example, a nonionic surface-active agent) usually employed in cationic electrodeposition paints may be added to the composition of this invention.

Electrodeposition coating of the aqueous dispersion on articles may be carried out by methods and apparatuses which have normally been used for cationic electrodeposition coating. Desirably, an article to be coated is used as a cathode and a carbon plate, as an anode. There is no particular restriction on the electrodeposition coating conditions. Generally, the electrodeposition is desirably carried out with stirring under the following conditions.

Bath temperature: 20° to 30° C.
Voltage: 100 to 400 V (preferably 200 to 300 V)
Current density: 0.01 to 3 A/dm$^2$
Time during which a current was passed: 1 to 5 minutes
Ratio of the urea of the anode to that of the cathode: 2:1 to 1:2
Distance between the electrodes: 10–100 cm The coated film deposited on the article as a cathode can be cured by first washing it and then baking it at about 150° to about 180° C.

The composition of this invention may also be used as a solvent-base baking paint composition by diluting it with an ordinary organic solvent.

The following Examples illustrate the present invention more specifically.

EXAMPLE 1

Primary amino groups were introduced into an epoxy resin through tertiary amino groups in accordance with the following recipe.

| Starting materials | Parts by weight |
| --- | --- |
| Epon 1002 (*1) | 1300 |
| Ethylene glycol monoethyl ether | 390 |
| Diethylenetriamine-methyl isobutyl ketone diketimine (*2) | 534 |

(*1): Epoxy resin having an epoxy equivalent of about 650 manufactured by Shell Chemical Co.
(*2): Obtained by heating diethylenetriamine with an excess of methyl isobutyl ketone under reflux, dehydrating the reaction mixture, and removing the excess of methyl isobutyl ketone.

Epon 1002 was dissolved under heat in ethylene glycol monoethyl ether, and diethylenetriamine-methyl isobutyl ketone diketimine was added and reacted at 90° C. for about 90 minutes. The reaction product had a tertiary amine value (*3) of 60.

(*3) The tertiary amine value (mg KOH/gram of the solids of the sample) was determined by dissolving the sample in acetic anhydride/acetic acid (=9/1 by weight) and boiling it to acetylate it, and thereafter titrating the product with a perchloric acid-acetic acid solution using Crystal Violet as an indicator.

In accordance with the following recipe, half of the primary amino groups in the reaction product were converted to beta-hydroxyalkyl carbamate groups.

| Starting materials | Parts by weight |
|---|---|
| Reaction product | 2224 |
| Deionized water | 72 |
| Ethylene carbonate | 176 |

Deionized water was added to the above reaction product, and reacted at 90° C. for 30 minutes to hydrolyze the ketimine groups. Then, ethylene carbonate was added and the reaction was carried out at 90° C. for 60 minutes. The resulting resin composition had a solids content of 68%, and an amine value of 67. The equivalent weight of the functional groups of formula (I) is about 840 (theoretical value).

The resin composition was diluted to a solids content of 50% with ethylene glycol monoethyl ether, and 2 PHR of lead octenoate (Pb content 38%) was added. The resulting coating composition was coated on a tin plate and a non-treated cold-rolled steel plate, and baked at 160° C. for 30 minutes to form a smooth hard coated film having a thickness of 20 microns on both plates.

The curability of the coated film on the tin plate was examined by using its gel fraction, and the corrosion resistance of the coated film on the nontreated steel plate was examined by a salt spray test.

The gel fraction (*4) was 93%, and the salt spray resistance (in accordance with JIS K5400-7.8) was more than 500 hours.

(*4) The sample was extracted with a mixed solvent of acetone and methanol (1:1 by volume) under reflux for 5 hours, and the gel fraction was determined from the ratio of the coated film which remained unextracted.

EXAMPLE 2

Primary amino groups were introduced into an epoxy resin through tertiary amino groups in accordance with the following recipe.

| Starting materials | Parts by weight |
|---|---|
| Epon 1004 (*5) | 2000 |
| Ethylene glycol monobutyl ether | 800 |
| Diethylenetriamine-methyl isobutyl ketone diketimine | 534 |

(*5): An epoxy resin having an epoxy equivalent of about 950 manufactured by Shell Chemical Co.

Epon 1004 was dissolved under heat in ethylene glycol monobutyl ether, and diethylenetriamine-methyl isobutyl ketone diketimine was added. The mixture was reacted at 100° C. for 60 minutes. The product had a tertiary amine value of 44.

All primary amino groups in the reaction product were converted to beta-hydroxyalkyl carbamate groups in accordance with the following recipe.

| Starting materials | Parts by weight |
|---|---|
| The reaction product obtained as above | 3334 |
| Deionized water | 72 |
| Propylene carbonate | 408 |

Deionized water was added to the reaction product obtained above, and the mixture was reacted at 90° C. for 60 minutes to hydrolyze the ketimine groups. Then, propylene carbonate was added, and reacted at 90° C. for 2 hours. The resulting resin composition had a solids content of 68.5% and an amine value of 27.

The resin composition was diluted to a solids content of 40% with ethylene glycol monobutyl ether, and 3 PHR of lead naphthenate (Pb content 30%) was added. The resulting coating composition was coated on the same plates as used in Example 1, and the gel fraction and salt spray resistance of the coated films were examined.

The gel fraction was 96%, and the salt spray resistance was more than 600 hours.

EXAMPLE 3

A resinous compound having beta-hydroxyalkyl carbamate groups was produced through tertiary amino groups in accordance with the following recipe.

| Starting materials | Parts by weight |
|---|---|
| Epon 828 (*6) | 380 |
| Piperazine | 172 |
| Ethylene glycol monoethyl ether | 150 |
| Ethylene carbonate | 176 |

(*6): An epoxy resin having an epoxy equivalent of 190 manufactured by Shell Chemical Co.

Piperazine was dissolved in ethylene glycol monoethyl ether, and Epon 828 was gradually added at 70° C. The reaction was carried out at 80° C. for 120 minutes. The product had a tertiary amine value of 200. Ethylene carbonate was added, and the mixture was reacted at 80° C. for 60 minutes to give a resinous compound having a solids content of 83% and an amine value of 120.

Sixty parts of the resulting compound was mixed with 40 parts of a polyamide resin having an amine value of 90 (Versamid 100 manufactured by Nippon General Mills Co., Ltd.) and 40 parts of xylene. Ten parts of zinc naphthenate (Zn content 10%) was added. The resulting coating composition was coated on a zinc phosphate-treated steel plate and baked at 180° C. for 20 minutes to obtain a coated film having a thickness of 25 microns, solvent resistance and high flexibility.

The coated film had a solvent (methyl isobutyl ketone) wiping resistance (*7) of more than 20 cycles, a salt spray resistance of more than 800 hours, and an impact strength (determined by the Du Pont impact test) of more than 50 cm (½ inch under a load of 1 kg).

(*7): The solvent resistance was determined by the following procedure.

A gauze was wetted with methyl isobutyl ketone and rubbed strongly against the coated film surface through reciprocations over a distance of 10 cm. The number of reciprocations performed until the coated film was scratched and showed a hazy gloss was determined, and defined as the solvent wiping resistance.

EXAMPLE 4

A resin in accordance with this invention was prepared in accordance with the following recipe.

| Starting materials | Parts by weight |
| --- | --- |
| Epon 1001 (*8) | 3800 |
| Acidic ester (*9) of PTG-200 (*10) and adipic acid | 1360 |
| Imidazoline | 2.5 |
| Ethylene glycol monobutyl ether | 1032 |
| Diethylenetriamine-methyl isobutyl ketone diketimine | 1602 |
| Deionized water | 216 |
| Ethylene carbonate | 792 |

(*8): An epoxy resin having an epoxy equivalent of 475 manufactured by Shell Chemical Co., Ltd.
(*9): An ester having an acid value of 82 obtained by reacting 1 mole of PTG-200 with 2 moles of adipic acid.
(*10): Polytetramethylene glycol having a hydroxy equivalent of 550 manufactured by Japan Polyurethane Co., Ltd.

Epon 1001 and the acidic ester of PTG-200 and adipic acid were reacted in the presence of imidazoline as a catalyst at 140° C. until the acid value of the product became 1 or less. Ethylene glycol monobutyl ether was added, and the mixture was cooled. Then, diethylenetriamine-methyl isobutyl ketone diketimine was added, and the mixture was reacted at 90° C. for 90 minutes. The product had a tertiary amine value of 50. Deionized water was added, and the reaction was further carried out at 90° C. for 30 minutes. Finally, ethylene carbonate was added, and the reaction was carried out at 90° C. for 60 minutes to give a resin composition having a solids content of 75% and an amine value of 20. To 131 parts of the resin composition was added 2 parts of lead octenoate (Pb content 38%), and the mixture was neutralized with 1.32 parts of acetic acid. The neutralized mixture was dispersed in water to form a clear bath having a solids content of 15%. The bath was stirred overnight at 30° C., and a tin plate, a non-treated steel plate and a zinc phosphate-treated steel plate were each dipped in the bath and electrodeposition was carried out at 25° C. The coated films were each baked at 170° C. for 20 minutes to prepare coated films having a thickness of about 20 microns. The coated films were tested, and the results were as follows:

Gel fraction: 94%
Salt spray resistance of the coated film on the non-treated steel plate: 600 hours
Impact strength of the coated film on the zinc phosphate-treated steel plate: ½ inch, more than 50 cm (load 1 kg)

EXAMPLE 5

A resinous compound having beta-hydroxyalkyl carbamate groups was produced through tertiary amino groups in accordance with the following recipe.

| Starting materials | Parts by weight |
| --- | --- |
| Ethylenediamine | 180 |
| Ethylene carbonate | 264 |
| Ethylene glycol monoethyl ether | 320 |
| Epon 828 | 760 |
| 2-Ethylhexyl acrylate | 368 |

Ethylenediamine was dissolved in ethylene glycol monoethyl ether, and ethylene carbonate was added little by little at 60° C. The reaction was carried out until the amine value of the product decreased to 380. Then, Epon 828 was added at 60° C., and the reaction was further carried out at 80° C. for 60 minutes. Finally, 2-ethylhexyl was added, and the reaction was carried out at 80° C. until the tertiary amine value of the product became 100. A resin having a solids content of 83% was obtained.

A resinous compound having primary and/or secondary amino groups was prepared in accordance with the following recipe.

| Starting materials | Parts by weight |
| --- | --- |
| Epon 1002 | 1300 |
| Ethylene glycol monobutyl ether | 520 |
| Monoethanolamine-methyl isobutyl ketone ketimine | 215 |
| Versamid 100 | 600 |
| Deionized water | 27 |

Epon 1002 was dissolved in ethylene glycol monobutyl ether, and monoethanolamine-methyl isobutyl ketone ketimine was added. The reaction was carried out at 150° C. until the water-soluble amine value (*11) became less than 1. The reaction mixture was cooled to 90° C., and Versamid 100 was added. The reaction was carried out until the rise of the viscosity of the reaction mixture reached saturation. Water was added to form a resin having a solids content of 75% and an amine value of 55.

(*11) The sample was dissolved in xylene/butanol/ethanol (1/1/1 by volume) and extracted with the same amount of a saturated aqueous solution of sodium chloride. The amine value (mg KOH/g of solids of the sample) of the resulting aqueous layer is defined as the water-soluble amine value.

The resulting resin containing beta-hydroxyalkyl carbamates (42 parts) and 87 parts of the resin containing primary and/or secondary amino groups were mixed, and 2.5 parts of lead octylate (Pb content 20%) was added. The resin composition was subjected to neutralization with 2.7 parts of acetic acid to form a clear bath having a solids content of 15%.

Electrodeposition was carried out in the same way as in Example 4 to form coated films.

Gel fraction: 92%
Salt spray resistance of the coated film on the non-treated steel sheet: more than 500 hours
Impact strength of the coated film on the zinc phosphate-treated steel sheet: ½ inch, more than 50 cm (load 500 g)

EXAMPLE 6

A resinous compound having beta-hydroxyalkyl carbamate groups was prepared in accordance with the following recipes.

| Starting materials | Parts by weight |
| --- | --- |
| Dimeric fatty acid | 560 |
| Triethylenetetramine | 292 |
| Xylene | 42 |
| Propylene carbonate | 306 |
| Ethylene glycol monoethyl ether | 216 |

Dimeric fatty acid was reacted with triethylenetetramine under refluxing of xylene at 200° to 220° C., and the reaction was continued until the amount of water dehydrated reached saturation. After cooling, ethylene glycol monoethyl ether was added, and propylene carbonate was gradually added at 60° C. The reaction was carried out at the same temperature until the amine value of the product decreased to 150.

A resin compound containing a monoepoxide was prepared in accordance with the following recipe.

| Starting materials | Parts by weight |
| --- | --- |
| Epon 1001 | 1900 |
| Ethylene glycol monobutyl ether | 384 |
| Methyl isobutyl ketone ketimine of monoethanolamine | 286 |

Epon 1001 was dissolved in ethylene glycol monobutyl ether, and methyl isobutyl ketone ketimine of monoethanolamine was added. The reaction was carried out at 140° C. until the water-soluble amine value became less than 1.

The resinous compound prepared as above was added to the reaction product, and the reaction was carried out a 80° C. until the tertiary amine value of the resulting product became 37. Thus, a resin composition of the invention having a solids content of 79% and an amine value of 56 was obtained.

Three parts of lead naphthenate (Pb content 30%) was added to 127 parts of the resin composition obtained. The resin composition was then subjected to neutralization with 2.1 parts of acetic acid to form a clear bath having a solids content of 15%. Electrodeposition coating of this bath was performed on a tin plate, a non-treated steel plate and a zinc phosphate-treated steel plate at 25° C. from the clear bath, and the coated films obtained were each baked at 160° C. for 30 minutes. As a result, coated films each having a thickness of about 20 microns were prepared.

Gel fraction: 98%

Salt spray resistance of the coated film on the non-treated steel plate: 700 hours Impact strength of the coated film on the zinc phosphate-treated steel plate: ½ inch, more than 50 cm (load 1 kg)

EXAMPLE 7

A resin composition of this invention was prepared in accordance with the following recipe.

| Starting materials | Parts by weight |
| --- | --- |
| Epon 1001 | 1900 |
| Ethylene glycol monoethyl ether | 500 |
| Dimeric fatty acid | 420 |
| Acrylic acid | 180 |
| Imidazoline | 2.5 |
| Diethylenetriamine-methyl isobutyl ketone diketimine | 667.5 |
| Deionized water | 45 |
| Ethylene carbonate | 264 |

Epon 1001 was dissolved in ethylene glycol monoethyl ether, and dimeric fatty acid and added. They were reacted in the presence of imidazoline as a catalyst at 140° C. until the acid value of the reaction product became less than 1. Diethylenetriamine-methyl isobutyl ketone diketimine was added, and the reaction was carried out at 90° C. until the tertiary amine value of the reaction product became 50. Deionized water was added to perform hydrolysis at 90° C. for 30 minutes. Ethylene carbonate was added, and the reaction was carried out at the same temperature until the amine value of the product decreased to 40.

The resulting resin composition (solids content 76%) in an amount of 132 parts was taken, and 3 parts of lead naphthenate (Pb content 30%) was added. The resin composition was subjected to neutralization with 2.1 parts of acetic acid to form a clear bath having a solids content of 15%. Electrodeposition was carried out from the clear in an amount of 132 parts was taken, and 3 parts of lead naphthenate (Pb content 30%) was added. The resin composition was subjected to neutralization with 2.1 parts of acetic acid to form a clear bath having a solids content bath in the same way as in Example 6 to form coated films.

Gel fraction: 96

Salt spray resistance of the coated film on the non-treated steel plate: more than 500 hours Impact strength of the coated film on the zinc phosphate-treated steel plate: ½ inch, more than 50 cm (load 500 g)

What is claimed is:

1. A heat-curable resin coating composition comprising as a resin binder a film-forming resin which contains at least two tertiary nitrogen atoms per molecule and may optionally contain primary or secondary amino groups, each of said tertiary nitrogen atoms having directly bonded thereto a functional group represented by the following formula $$-R_1-N-C-O-CH_2-CH-R_3 \quad (I)$$
$$\phantom{-R_1-N}|\phantom{-C}||\phantom{-O-CH_2-C}|$$
$$\phantom{-R_1-N}R_2\phantom{-}O\phantom{-O-CH_2-C}OH$$

wherein $R_1$ represents a divalent saturated aliphatic hydrocarbon group having 1 to 18 carbon atoms which may be substituted by a hydroxyl group and/or may be interrupted by an ether linkage (—O—); $R_2$ represents a hydrogen atom, a substituted or unsubstituted alkyl group having 1 to 6 carbon atoms, or a part of the main chain of the resin; and $R_3$ represents a hydrogen atom or a hydrocarbon group having 1 to 12 carbon atoms which may be substituted by a hydroxyl group and/or may be interrupted by an ether linkage, and each of said tertiary nitrogen atoms optionally forming a member of a nitrogen-containing heterocyclic ring formed together with $R_1$ and $R_2$ in the above formula and the nitrogen atom to which they are bonded.

2. The composition of claim 1 wherein $R_1$ in formula (I) is selected from $-CH_2CH_2-$, $-CH_2CH_2CH_2-$, $-CH_2CH_2CH_2CH_2-$ and

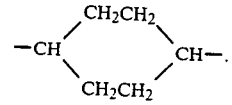

3. The composition of claim 1 wherein $R_2$ in formula (I) is selected from a hydrogen atom, a methyl group, an ethyl group, a hydroxyethyl group and an aminoethyl group.

4. The composition of claim 1 wherein $R_3$ in formula (I) is a hydrogen atom or a methyl group.

5. The composition of claim 1 wherein said functional group is selected from the class consisting of $$-CH_2CH_2-N-C-O-CH_2-CH-H$$
$$\phantom{-CH_2CH_2-N}|\phantom{-C}||\phantom{-O-CH_2-C}|$$
$$\phantom{-CH_2CH_2-N}H\phantom{-}O\phantom{-O-CH_2-C}OH$$

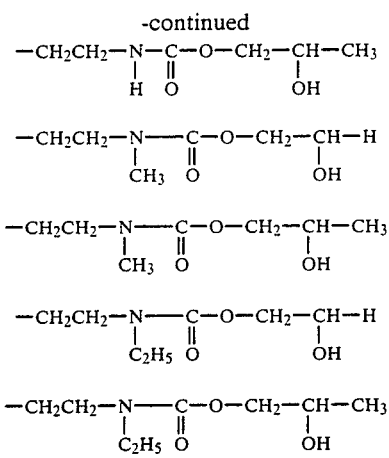

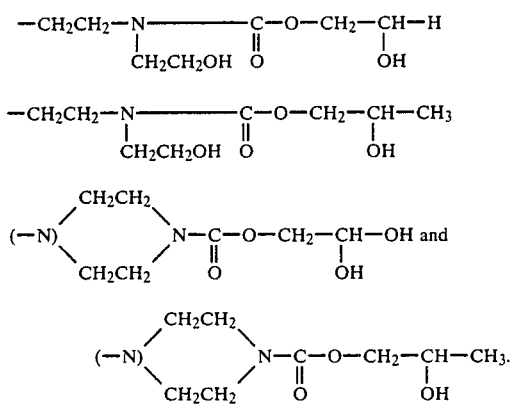

6. The composition of claim 1 wherein the content of the functional groups of formula (I) is 250 to 5,000 equivalent weight.

7. The composition of claim 1 wherein said film-forming resin contains amino groups selected from aliphatic primary and secondary amino groups in addition to the functional groups of formula (I).

8. The composition of claim 7 wherein the content of said amino groups is represented by an amine value of 10 to 200.

9. The composition of claim 1 wherein the film-forming resin is a reaction product of an epoxy resin having at least two epoxy groups, an aliphatic polyamine having at least two primary and/or secondary amino groups and an alkylene carbonate.

10. The composition of claim 9 wherein the epoxy resin has a number average molecular weight of at least about 350.

11. The composition of claim 9 wherein the epoxy resin has an epoxy equivalent of 150 to 4,000.

12. The composition of claim 9 wherein the epoxy resin is represented by the general formula

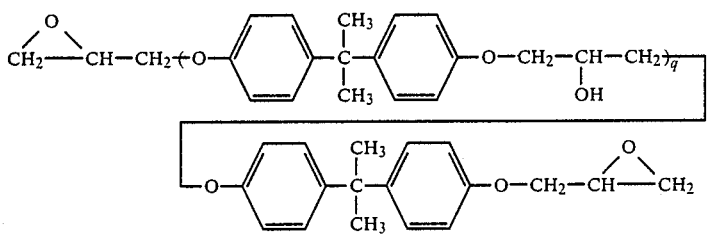

wherein q is 0 to 4.

13. The composition of claim 9 wherein the aliphatic polyamine is selected from the group consisting of ethylenediamine, hexamethylenediamine, diethylenetriamine, piperazine, hydroxyethylethylenediamine and N-aminoethylpiperazine.

14. The composition of claim 9 wherein the alkylene carbonate is ethylene carbonate or propylene carbonate.

15. The composition of claim 1 which further contains as a curing agent component a resin having at least about two aliphatic primary and/or secondary amino groups on an average per molecule and/or a resin resulting from substituting less than two amino groups of said resin by the functional group of formula (I).

16. The composition of claim 15 wherein the content of the resin is such that the number of the aliphatic primary and/or secondary amino groups which the resin has is equivalent to or smaller than the number of the functional groups of formula (I).

* * * * *

Notice of Adverse Decisions in Interfernce

In Interference No. 101,573, involving Patent No. 4,528,363, A. Tominaga, HEAT-CURABLE RESIN COATING COMPOSITION, final judgment adverse to the patentee was rendered August 8, 1989, as to claims 1-16.

*(Official Gazette February 20, 1990)*